(12) United States Patent
Berzin

(10) Patent No.: US 8,514,864 B2
(45) Date of Patent: Aug. 20, 2013

(54) SYSTEM AND METHOD FOR PROVIDING NETWORK MOBILITY

(75) Inventor: Oleg Berzin, Huntingdon Valley, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 669 days.

(21) Appl. No.: 12/415,032

(22) Filed: Mar. 31, 2009

(65) Prior Publication Data

US 2010/0246545 A1    Sep. 30, 2010

(51) Int. Cl.
*H04L 12/28*    (2006.01)
(52) U.S. Cl.
USPC ............ 370/395.31; 370/395.52; 370/395.53; 370/401
(58) Field of Classification Search
None
See application file for complete search history.

(56) References Cited

U.S. PATENT DOCUMENTS

| | | | |
|---|---|---|---|
| 7,266,119 B2 * | 9/2007 | Fan et al. | 370/389 |
| 7,633,921 B2 * | 12/2009 | Thubert et al. | 370/338 |
| 8,180,891 B1 * | 5/2012 | Harrison | 709/224 |
| 2005/0237983 A1 | 10/2005 | Khalil et al. | |
| 2006/0010250 A1 * | 1/2006 | Eisl et al. | 709/245 |
| 2007/0237317 A1 * | 10/2007 | Suda | 379/112.04 |
| 2008/0317038 A1 | 12/2008 | Pasko et al. | |
| 2009/0022115 A1 | 1/2009 | Berzin et al. | |

OTHER PUBLICATIONS

"Multi-VPN Routing and Forwarding on the Home agent (Chapter 12)" In: Cisco: "Cisco Mobile Wireless Home Agent Feature Guide", Dec. 22, 2005, XP008154135.

* cited by examiner

*Primary Examiner* — Alex Skripnikov

(57) ABSTRACT

An approach is provided for extending private enterprise networking to wireless interconnecting domains. A home agent maintains a first routing table for a first wireless router configured to route according to a first address space. The home agent also maintains a second routing table for a second wireless router configured to route according to a second address space. The first address space and the second address space are overlapping.

20 Claims, 5 Drawing Sheets

US 8,514,864 B2

SYSTEM AND METHOD FOR PROVIDING NETWORK MOBILITY

BACKGROUND INFORMATION

Enterprise interworking typically involves the establishment of end-to-end connectivity among sites of an enterprise (or site) over a "wired" infrastructure. This type of connectivity has been traditionally enabled through various routing protocols, such as open shortest path first (OSPF), routing information protocol (RIP), border gateway protocol (BGP), and the like. Depending on the types of underlying networks, the operation of these routing protocols may be different but, in all cases, each protocol seeks to achieve the propagation of reachability information among interconnected sites so as to establish direct end-to-end connectivity between the sites. For security purposes, enterprises also seek to establish this direct end-to-end connectivity through private networking services. Typically, this capability is offered through addressing and routing techniques, such as multiprotocol label switching, virtual private networking (MPLS/VPN) services, which essentially enable service providers to logically partition their networks—using, for example, virtual routing and forwarding (VRF)—to permit sites with overlapping internet protocol (IP) addressing to share the same physical networking infrastructures, but maintain privacy through logical networking virtualization techniques.

As wireless networking capabilities continue evolve and offer increased reliability and throughput, enterprises are increasingly considering wireless connectivity as a potential source of both primary and secondary access to their enterprise (or private) networks. As such, suitable wireless interconnecting networks must be able to support the aforementioned direct end-to-end connectivity, as well as enable private networking services. Unfortunately, network virtualization and the ability to support multiple enterprises having overlapping or identical IP addressing spaces have been limited to the "wired" domains.

Therefore, there is a need for an approach that extends private enterprise networking to wireless interconnecting domains.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for extending private enterprise networking to wireless interconnecting domains are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to interworking between mobile routers and multi-protocol label switching (MPLS) virtual private networking (VPN) traffic flows, it is contemplated that various exemplary embodiments are also applicable to other equivalent or suitable technologies and traffic flows.

Figure 1:
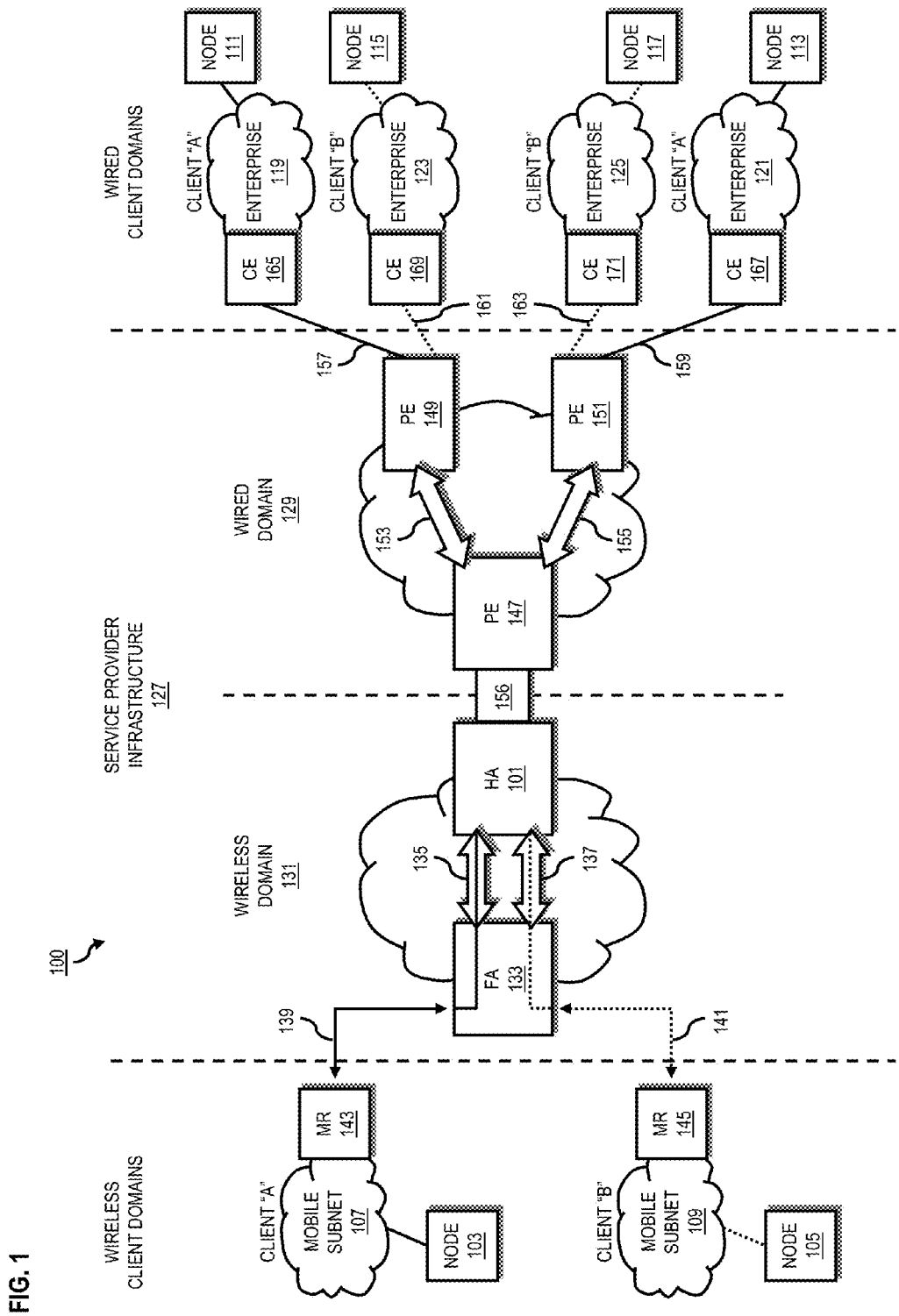
FIG. 1 is a diagram of a system capable of supporting private enterprise network mobility, according to an exemplary embodiment.

FIG. 1 is a diagram of a system capable of supporting private enterprise network mobility, according to an exemplary embodiment. For the purposes of illustration, system 100 is described with respect to home agent (HA) 101 that is configured to facilitate the establishment of private end-to-end connectivity between one or more client nodes (e.g., nodes 103 and 105) associated with one or more wireless client domains (e.g., mobile subnets 107 and 109) and one or more client correspondent nodes (e.g., nodes 111, 113, 115, and 117) of one or more wired client domains (e.g., enterprises (or sites) 119, 121, 123, and 125). In this manner, direct end-to-end connectivity may be realized via service provider infrastructure 127, which may include one or more wired domains (e.g., wired domain 129) and one or more wireless domains (e.g., wireless domain 131). According to exemplary embodiments, wired domain 129 implements one or more virtual private networking architectures (e.g., a multiprotocol label switching virtual private network (MPLS VPN) architecture, etc.), whereas wireless domain 125 implements one or more mobile internet protocol (MIP) architectures (e.g., MIPv4, MIPv6, etc.) in conjunction with one or more network mobility (NEMO) extensions to implemented MIP architectures (e.g., NEMOv4, NEMOv6, etc.). While specific reference will be made hereto, it is contemplated that system 100 may embody many forms and include multiple and/or alternative components and facilities.

It is noted that mobile networking offers enterprises the advantages of ubiquitous connectivity. Macro-mobility management for mobile hosts using a mobile internet protocol (MIP) architecture is provided by, for example, MIPv4, defined in Perkins, "IP Mobility Support for IPv4," Request for Comments (RFC) 3344, August 2002, which is incorporated herein, by reference, in its entirety. Within a MIPv4 domain, there exists four main networking entities (or nodes), i.e., a mobile node (MN), i.e., a host or router that changes its point of connection from one network (or subnet) to another, a correspondent node (CN), i.e., a peer (whether stationary or mobile) that the MN communicates with, a home agent (HA), i.e., a router on a home network of the MN that tunnels traffic for delivery to the MN when the MN changes its point of connection from the home network to a visited (or foreign) network, and a foreign agent (FA), i.e., a router on the visited network that provides routing services to the MN while the MN is registered with the FA. In this manner, a MN can be assigned a "long-term" IP address by the HA, such that when the MN changes its point of connection from the home network to a visited network, a care-of-address (CoA) or co-located care-of-address (CCoA) can be associated with the MN in order to reflect a "current" point of connection for the MN. As such, MIPv4 utilizes traffic tunneling between an FA and the HA of a MN, which results in a triangular routing scheme.

Improvements to MIPv4 are provided by MIPv6 defined in Johnson, et al., "Mobility Support in IPv6," RFC 3775, June 2004, which is incorporated herein, by reference, in its entirety. Like MIPv4, MIPv6 enables macro-mobility management; however, MIPv6 eliminates the FA and provides hierarchical mobility management (HMIP). Despite these improvements, MIPv6 still utilizes an HA, which ultimately results in a tunneling and triangular routing scheme.

Extensions to MIPv6 for enabling stationary or mobile nodes, such as stationary or mobile routers, to connect with a mobile network are defined in Devarapalli, et al., "Network Mobility (NEMO) Basic Support Protocol," RFC 3963, January 2005, which is incorporated herein, by reference, in its entirety. NEMOv6 allows a MN to register with an HA and receive a home address, as well as register one or more associated networking prefixes with the HA. In this manner, a MN can establish a bi-directional tunnel with the HA using, for example, IPv6 generic packet tunneling. The HA will bind the one or more networking prefixes associated with the MN to the CoA associated with the MN. It is noted that these one or more networking prefixes may be associated with other networks or particular end-user devices. As such, the HA will advertise the one or more networking prefixes to various "other" nodes for traffic routing purposes. Accordingly, when traffic is to be transmitted to one or more of the associated prefixes, the "other" nodes will route the traffic to the HA, the HA will tunnel the traffic to the MN, and the MN will forward the traffic to the one or more networking prefixes.

Like MIPv6, extensions to MIPv4 that enable MNs to register associated networking prefixes during registration with an associated HA, are defined in Leung, et al., "Network Mobility (NEMO) Extensions for Mobile IPv4," RFC 5177, April 2008, which is incorporated herein, by reference, in its entirety. It is noted, however, that NEMOv4 may operate through an FA or in a CCoA mode. Within the CCoA framework, a MN will register its CCoA, its home address, and one or more associated networking prefixes, directly with the HA associated with the MN. Accordingly, the MN will establish a direct tunnel with the HA for traffic routing purposes. Thus, when traffic is to be transmitted to one or more of the networking prefixes, the HA will forward traffic destined to the one or more networking prefixes through the direct tunnel, which can be identified by the registered CCoA.

It is also noted that virtual private networking enables enterprises to decrease their communication costs by replacing exclusive communication lines with one or more virtual paths over, for example, an interconnecting network, such as the Internet. One form of virtual private network (VPN) is provided through multi-protocol label switching (MPLS), which is defined in Rosen, et al., "BGP/MPLS IP Virtual Private Networks (VPNs)," February 2006, which is incorporated herein, by reference, in its entirety. MPLS VPNs enable virtualization of a "same" physical infrastructure and provide private IP-based network services to multiple enterprises with overlapping or identical address spaces (e.g., IP addressing). An MPLS VPN includes two primary types of nodes, i.e., provider edge (PE) nodes, i.e., nodes that connect an MPLS domain with nodes "foreign" to the MPLS domain (such as customer edge (CE) nodes), and provider (P) nodes, i.e., the various nodes of an MPLS domain. In this manner, PE nodes implement per customer virtual routing and forwarding (VRF), as well as utilize multiprotocol (MP) border gateway protocol (BGP) to separate routing and forwarding information among different customers, which is explained in more detail within Bates, et al., "Multiprotocol Extensions for BGP-4," RFC 4760, January 2007, which is incorporated herein, by reference, in its entirety. As such, MPLS VPNs implement VPN services through MPLS label-stack forwarding rather than utilizing overlay tunneling techniques. That is, MP-BGP is utilized as a control plane protocol for MPLS VPN services, which enables routing information to be partitioned via route distinguishers and route targets, as well as enables specific MPLS label designations to be advertised to specific customer VRF instances. Additionally, MP-BGP can be utilized to segment traffic at the forwarding plane.

Unfortunately, current mobile networking standards, such as MIPv4, MIPv6, NEMOv4, and NEMOv6, are not able to address network virtualization or support multiple enterprises with overlapping or identical address spaces, like that within conventional wired domains, e.g., MPLS VPN domains. Therefore, the approach according to certain embodiments of system 100 stem from the recognition that by enabling private enterprise network mobility services, network services providers can leverage existing Mobile IP infrastructures (e.g., MIPv4, MIPv6, NEMOv4, NEMOv6, etc.) to provision private enterprise connectivity from one or more mobile or stationary routers (i.e., MNs) to one or more VPNs, (e.g., one or more MPLS VPNs).

As previously mentioned, wired domain(s) 129 and wireless domain(s) 131 may embody all or a portion of a service provider infrastructure 127. In this manner, wireless domain 131 may include HA 101, FA 133, and one or more "other" nodes (not shown) interior to wireless domain 131, all of which may be configured to facilitate the establishment one or more traffic tunnels (e.g., traffic tunnels 135 and 137) between HA 101 and FA 133 that, consequently, traverse wireless domain 131. As will become more apparent below, traffic tunnels 135 and 137 may, in exemplary embodiments, also embody "double" tunnels. That is, tunnels 135 and 137 may also respectively include one or more additional tunnels 139 and 141 that are respectively established between HA 101 and MR 143 or MR 145. It is noted that the particular "legs" of tunnels 139 and 141 extending between FA 133 and MR 143 or MR 145 are wireless communication links, whereas the particular "legs" of tunnels 139 and 141 and/or tunnels 135 and 137 extending between HA 101 and FA 133, may be wired and/or wireless communication links.

In a similar fashion, wired domain 129 may include one or more provider edge (PE) nodes (e.g., PEs 147, 149, and 151), as well as one or more "other" nodes (not shown) interior to wired domain 129, all of which may be configured to respectively establish one or more physical or virtual pathways (e.g., pathways 153 and 155) between PE 147 and PE 149 or PE 151 that, consequently, traverse wired domain 129. Thus, to support end-to-end connectivity over service provider infrastructure 127, i.e., over wired domain(s) 129 and wireless domain(s) 131, HA 101 and PE 147 may be physically coupled via one or more physical communication links 156. As such, HA 101 may be configured to interwork between one or more traffic tunnels (e.g., traffic tunnels 135-141) and one or more pathways (e.g., pathways 153 and 155). That is, HA 101 may be configured to maintain a plurality of routing tables associated with MRs 143 and 145, which may be interworked (or otherwise correlated) with one or more routing tables associated with various pathways of wired domain 129, e.g., pathways 153 and 155, for forwarding network traffic to and receiving network traffic from enterprises 119-125.

According to particular embodiments, traffic tunnels 135-141 may be provisioned according to one or more MIP/NEMO protocols and pathways 153 and 151 may be provisioned according to one or more secure networking protocols, such as MPLS VPN protocols. As such, HA 101 may effectuate traffic interworking by integrating MIP/NEMO and MPLS/VPN techniques. That is, HA 101 may be configured to partition MIP/NEMO tunnel pairs associated with MRs 143 and 145 based on respective enterprise associations (e.g., associations with Client "A" or Client "B") and, thereby, may provision partitioned MIP/NEMO tunnel pairs into corresponding VRF instances (e.g., VRF instances 157, 159, 161, and 163), which may also be associated with respective enterprises. For example, VRF instances 157 and 159 may be associated with Client "A," whereas VRF instances 161 and 163 may be associated with Client "B." As such, routing entries (e.g., networking addresses) associated with, for example, nodes 103 and 105 (that are respectively registered by MRs 143 and 145 with HA 101), may be integrated into multiple routing tables utilized by HA 101 for routing and forwarding traffic over service provider infrastructure 127. In this manner, those network addresses "behind" MRs 143 and 145, i.e., the networking addresses associated with nodes 103 and 105, may overlap or even be identical.

Additionally, HA 101 may effectuate traffic interworking by correlating subscriber information (e.g., network access identifiers (NAI) of MRs 143 and 145) that is respectively associated with MRs 143 and 145, with respective MIP/NEMO registration information (e.g., MIP/NEMO home addresses) received by HA 101 during HA-MR MIP/NEMO registration. In this manner, HA 101 may discard MR home addresses (MR-HADDR) carried in MIP/NEMO registration requests (RRQ) associated with particular MRs in place of correlated, existing home addresses assigned to the particular MRs, as well as in place of other existing subscriber information (e.g., NAIs) associated with the particular MRs. As such, MR-HADDR suppression affords service providers greater flexibility in managing a plurality of MRs and associated MR addressing spaces (e.g., LAN IP sub-nets "behind" MRs). Namely, since MR-HADDRs and associated NAIs can be "translated" into existing MR home addresses, the MR-HADDR does not have to be unique and, thus, eliminates any need to separately manage and coordinate addressing across the plurality of MRs and NAIs associated with a plurality of clients.

As seen in FIG. 1, enterprise networks 119-125 include one or more customer edge (CE) nodes (e.g., CEs 165, 167, 169, and 171) and provide VPN services to one or more client nodes (e.g., nodes 111-117). CEs 165-171 may include any suitable router, switch, gateway, and/or the like, that act as "boundary nodes" to respective enterprises 119-125. In exemplary embodiments, enterprises 119 and 121 and, thereby, CEs 165 and 167, as well as nodes 111 and 113, may be owned and operated by a first client, i.e., Client "A," whereas enterprises 123 and 125 and, thereby CEs 169 and 171, as well as nodes 115 and 117, may be owned and operated by a second client, i.e., Client "B." In this manner, CEs 165-171 can provide traffic ingress into and/or traffic egress from respective enterprises 165-171. Further, Client "A" may also own and operate mobile subnet 107 and, thereby, MR 143 and node 103, whereas Client "B" may additionally own and operate mobile subnet 109 and, thereby, MR 145 and node 105. To this effect, system 100, via tunnels 135-141, pathways 153 and 155, physical communication link(s) 156, and VFR instances 157-163, in conjunction with the traffic interworking functions of HA 101, can extend private enterprise mobility to clients that employ identical or overlapping address spaces.

It is generally noted that nodes 103 and 105 may, according to exemplary embodiments, include any suitable mobile computing device, such as, for example, a mobile router, mobile computer, electronic notepad, laptop, mobile phone, personal communications system terminal, personal digital assistant, pager, mobile server, mobile switch, mobile workstation, and/or any other suitable mobile device capable of wireless and/or wired network communications. Nodes 111-117 may, in exemplary embodiments, include any suitable stationary computing device, such as, for instance, a router, switch, server, terminal, workstation, personal computer, etc. In this manner, it is further noted that nodes 103 and 105 may also embody one or more of the aforementioned stationary computing devices; however, by virtue of MRs 143 and 145, these stationary computing devices may be considered "mobilized." It is also noted that mobile subnets 107 and 109 may be configured to support any combination of mobile and/or mobilized, stationary computing devices.

According to exemplary embodiments, wired client domains (e.g., enterprises 119-125) may embody any one or more types of wired networks, such as suitable layer 3 IP networks, legacy networks providing native network services based on technologies such as, for example, Ethernet, asynchronous transfer mode (ATM), frame relay, frequency-division multiplexing (FDM), time-division multiplexing (TDM), and/or wavelength-division multiplexing (WDM), as well as any other suitable technology. Wireless client domains (e.g., mobile subnets 107 and 109) may embody any one or more types of wireless networks, such as information transmission systems utilizing BLUETOOTH, electromagnetic waves, infrared, microwaves, radio frequency, etc., as a carrier medium. It is also noted that mobile subnets 107 and 109 may additionally (or alternatively) embody one or more of the aforementioned wired networks that have been "mobilized" via corresponding MRs 143 and 145.

Figure 2:
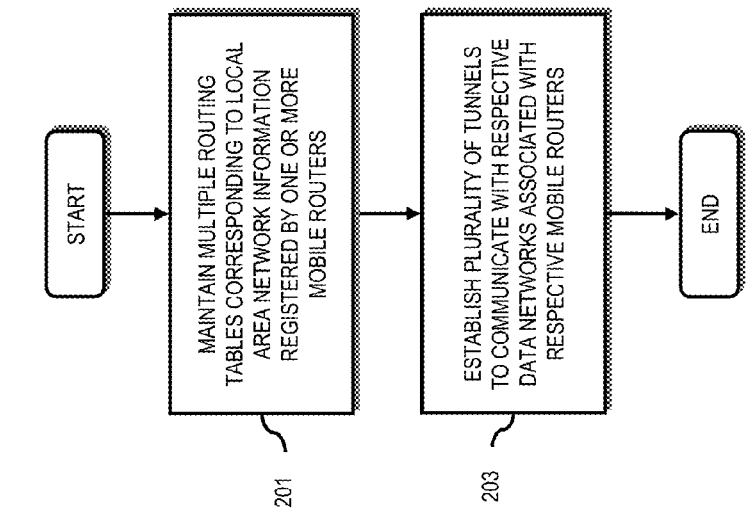
FIG. 2 is a flowchart of a process for providing private enterprise network mobility, according to an exemplary embodiment.

FIG. 2 is a flowchart of a process for providing private enterprise network mobility, according to an exemplary embodiment. For the purposes of explanation, the process is described with respect to FIG. 1. Moreover, it is assumed that MRs 143 and 145 have already registered with HA 101 and, thereby, obtained corresponding home addresses, as well as registered both their associated CoAs or CCoAs with HA 101 and their associated local area network (LAN) information, e.g., those sub-nets "behind" MRs 143 and 145. It is also assumed that PE 147 has advertised one or more pathways of wired domain 129 (e.g., pathways 153 and 155) to HA 101 for forwarding VPN network traffic from enterprises 119-125 to mobile subnets 107 and 109, as well as forwarding VPN network traffic from mobile subnets 107 and 109 to enterprises 119-125.

In step 201, multiple routing tables corresponding to local area network (LAN) information registered by one or more MRs (e.g., MRs 143 and 145) may be maintained by HA 101 and, thereby, utilized to forward network traffic to MRs 143 and 145 and/or PE 147 based on information stored to these multiple routing tables. At step 203, HA 101 establishes a plurality of tunnels (e.g., traffic tunnels 135-141) with FA 133 and a plurality of tunnels (e.g., traffic tunnels 139 and 141) with respective MRs 143 and 145, to communicate with respective MRs 143 and 145 and, thereby, exchanging network traffic between mobile subnets 107 and 109 and one or more enterprises (e.g., enterprises 119-125). In this manner, the provisioning of the plurality of tunnels may include HA 101 generating (or otherwise populating) multiple routing tables corresponding to local area network (LAN) information registered by one or more MRs (e.g., MRs 143 and 145), which may also include routing information advertised to HA 101 by, for example, PE 147 for exchanging network traffic with enterprises 119-125. It is noted that a particular routing table can be made to correspond to a particular MR. As such, the plurality of traffic tunnels 135-141 may be interworked onto, or otherwise placed into, corresponding VRF instances associated with wired domain 129, e.g., pathways 153 and 155. Accordingly, the use of separate routing tables that correspond to individual MRs 143 and 145 enables the addressing spaces "behind" MRs 143 and 145 to be overlapping or even identical. This enables the integration of NEMO MIP and VPN (e.g., MPLS/VPN) functionalities in support of overlapping or identical addressing spaces utilized by different enterprises.

Figure 3:
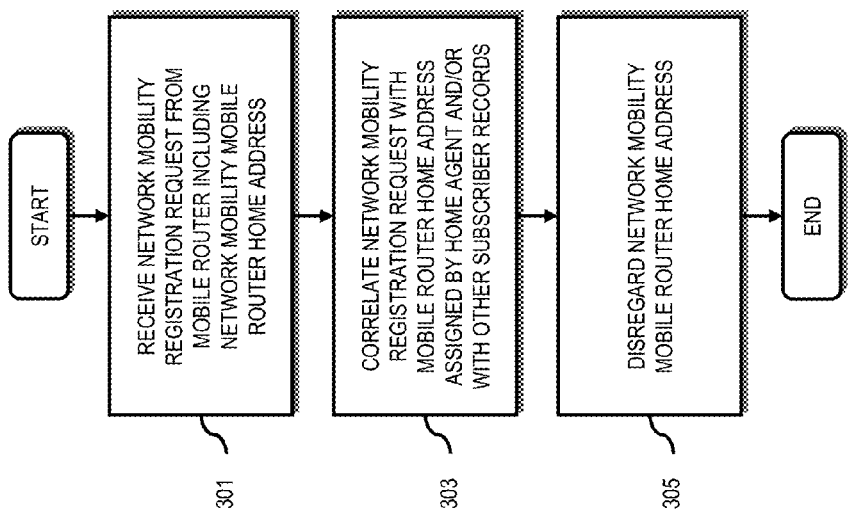
FIG. 3 is a flowchart of a process for disregarding network mobility mobile router home addresses in support of private enterprise network mobility, according to an exemplary embodiment.

FIG. 3 is a flowchart of a process for disregarding network mobility mobile router home addresses in support of private enterprise network mobility, according to an exemplary embodiment. For the purposes of explanation, the process is described with respect to FIG. 1, as well as assumed that HA 101 is privy to a repository (or other suitable memory) of subscriber information including, for example, one or more home addresses assigned to MRs 143 and 145 by HA 101, as well as the subscriber information registered with HA 101 by MRs 143 and 145, e.g., those NAIs of MRs 143 and 145 and any other suitable subscriber records.

At step 301, HA 101 receives a network mobility registration request (NEMO RRQ) from a particular MR, e.g., MR 143. The NEMO RRQ includes a network mobility MR home address (MR-HADDR) that is typically stored to a memory (not illustrated) of MR 143. In step 303, HA 101 correlates the NEMO RRQ and, in particular, the MR-HADDR within the NEMO RRQ, with the aforementioned subscriber information stored to, for instance, a subscriber information repository (not illustrated) or other suitable memory (not shown). In exemplary embodiments, the MR-HADDR is correlated with the home address assigned by HA 101 to MR 143 and/or correlated with other subscriber records corresponding to MR 143, such as the NAI information corresponding to MR 143. That is, HA 101 translates the MR-HADDR into the home address HA 101 assigned to MR 143, as well as translates the MR-HADDR into the NAI information corresponding to MR 143. As such, HA 101 may disregard, per step 305, the MR-HADDR of MR 143 in place of the home address HA 101 assigned to MR 143, which enables MRs of system 100, e.g., MRs 143 and 145, to have identical MR-HADDRs, but also enables HA 101 to uniquely identify MRs 143 and 145 without having to manage and coordinate the MR-HADDRs of MRs 143 and 145. This enables improved efficiencies in managing fleets of MRs associated with multiple enterprises (or clients).

Figure 4:
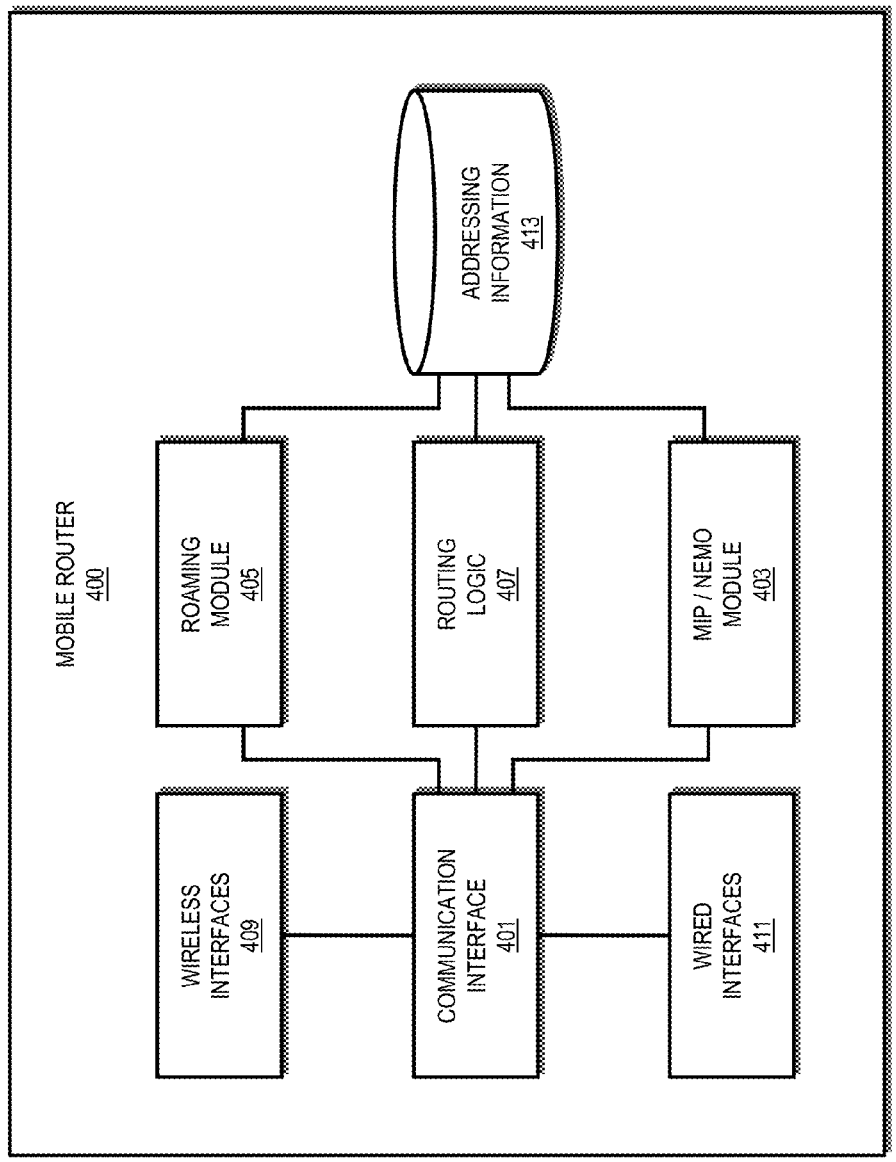
FIG. 4 is a diagram of a mobile router configured to support private enterprise network mobility, according to an exemplary embodiment.

FIG. 4 is a diagram of a mobile router configured to support private enterprise network mobility, according to an exemplary embodiment. Mobile router (MR) 400 may comprise computing hardware (such as described with respect to FIG. 6), as well as include one or more components configured to execute the processes described herein for facilitating private enterprise network mobility. In one implementation, MR 400 includes communication interface 401, MIP/NEMO module 403, roaming module 405, routing logic 407, wireless interfaces 409, and wired interfaces 411. While specific reference will be made to this particular implementation, it is contemplated that MR 400 may embody many forms and include multiple and/or alternative components.

In exemplary embodiments, MR 400 may wirelessly communicate with wireless domain 131 or with another device (e.g., node 103), via one or more wireless functions of communication interface 401 provided by wireless interfaces 409. In this manner, communication interface 401, via wireless interfaces 409, may include circuitry for communicatively coupling MR 400 with various wireless networks and is, thereby, configured to utilize various communication protocols including, for example, code division multiple access (CDMA), global system for mobile communications (GSM), Institute for Electrical and Electronics Engineers (IEEE) 802.11, IEEE 802.16 (WiMax), BLUETOOTH, user datagram protocol (UDP), transmission control protocol/Internet protocol (TCP/IP), general packet radio service (GPRS), wireless application protocol (WAP), and the like. Additionally (or alternatively), communication interface 401, via wired interfaces 411, may also be configured with wired communication capabilities, such as including circuitry for communicatively coupling MR with various wired networks, such as one or more of the aforementioned wired networks. By way of MIP/NEMO module 403, MR 400 can also implement MIPv4, MIPv6, NEMOv4, and/or NEMOv6 communications.

Accordingly, interfaces 401 and 409 enable MR 400 to connect with suitable radio access networks and initiate various communication sessions, e.g., data, voice, and/or video. As such, interfaces 401 and 409 may establish one or more point-to-point protocol sessions with FA 133. MR 400 may be authenticated via an authentication, authorization, and accounting facility (not shown) of system 100. In conjunction with MIP/NEMO module 403, communication interface 401 may register with one or more of HA 101 and FA 133. In this manner, HA 101 may provide MR 400 with a MIP home address in response to successful authentication and registration with HA 101. MIP/NEMO module 403 may store the MIP home address to addressing information repository 413.

In certain embodiments, communication interface 401 may be configured to determine an "attachment point" of MR 400 with wireless domain 131. Namely, communication interface may be configured to ascertain whether MR 400 is on a home network or whether MR 400 is on a foreign (or otherwise visited network). If on a visited network, roaming module 405 may be initialized by communication interface 401 and the MIP address of MR 400 may be provided to roaming module 405. In this manner, the MIP address of MR 400 may be considered a co-located care-of-address (CCoA).

In those instances when a CCoA is assigned to MR 400, routing logic 407 and MIP/NEMO module 403 may be configured to register the CCoA with HA 101, which can be particularly implemented via conventional NEMO processing. It is generally noted that NEMO processing causes MR 400 to establish a traffic tunnel (e.g., traffic tunnel 139) with HA 101, as well as register a MR-HADDR with HA 101 during a MIP/NEMO RRQ. It is noted that these tunnels may be bi-directional tunnels. Traditionally, MR-HADDRs had to be unique, so as to uniquely identify a MR to an HA. This requirement is eliminated via the processes described above. Further, it is also noted that outgoing MIP/NEMO RRQs may be appended with one or more identifications of networking addresses associated with MR 400. For instance, the networking addresses may correspond to those nodes (e.g., node 103) associated with MR 400. The networking addresses may be stored to addressing information repository (or memory) 413.

Routing logic 411 may be configured to forward traffic received from HA 101 to one or more destination nodes (e.g., node 103). In this manner, routing logic 411 will strip off tunnel headers from, for example, received packets and then forward "stripped" packets to an ultimate destination. Conversely, traffic (e.g., packets) received from one or more of nodes (e.g., node 103) associated with MR 400 may be appended with tunnel header information for forwarding to HA 101, which in turn interworks the traffic to wired domain 129.

While not illustrated, MR 400 may also include one or more processing units, as well as one or more memory units. The memory units may generally include random access memory (RAM), read-only-memory (ROM), and/or one or more permanent mass storage devices, such as a hard disk drive, tape drive, optical drive, and/or floppy disk drive. In this manner, the memory units may store various information, parameters, commands, programs, instructions, etc., for controlling operation of MR 400, which may be effectuated via the one or more processing units.

Figure 5:
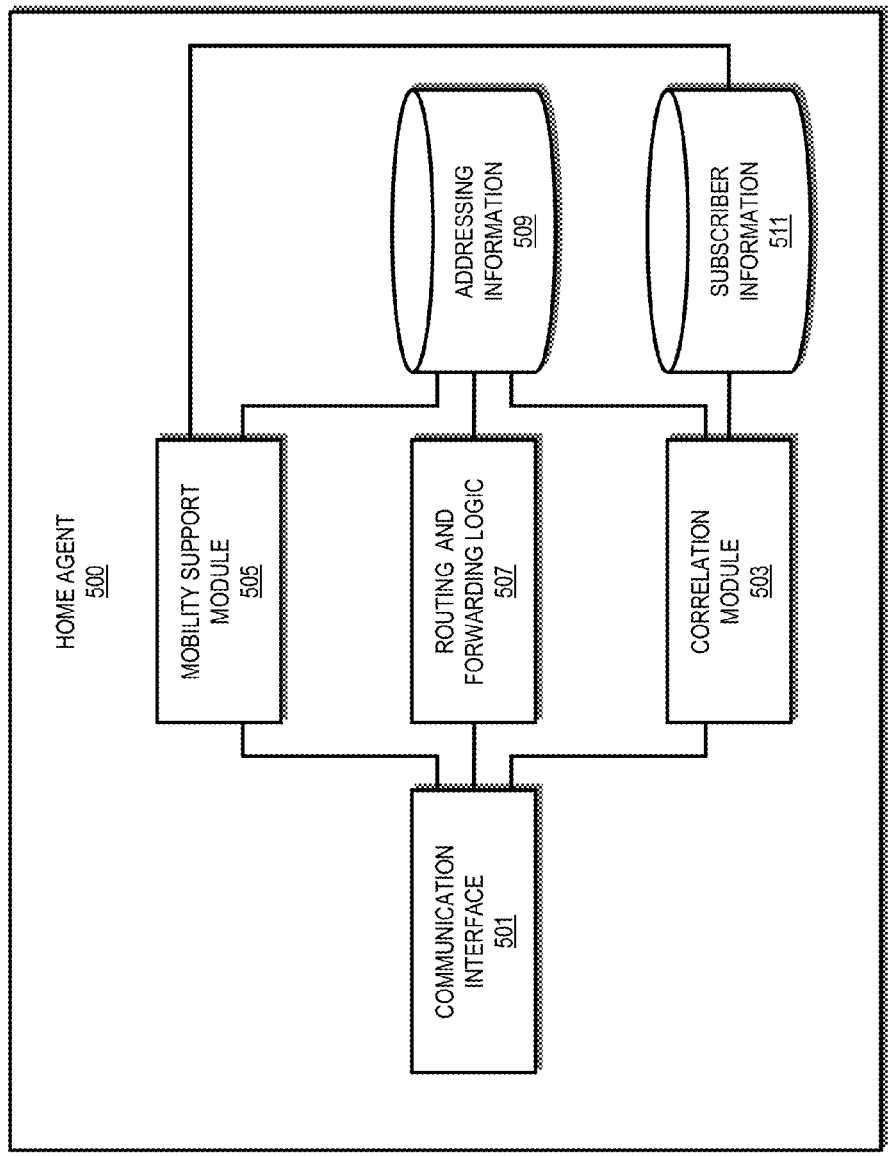
FIG. 5 is a diagram of a home agent configured to support private enterprise network mobility, according to an exemplary embodiment.

FIG. 5 is a diagram of a home agent configured to support private enterprise network mobility, according to an exemplary embodiment. Home agent (HA) 500 may comprise computing hardware (such as described with respect to FIG. 6), as well as include one or more components configured to execute the processes described herein for facilitating private enterprise network mobility. In one implementation, HA 500 includes communication interface 501, correlation module 503, mobility support module 505, and routing and forwarding logic 507. While specific reference will be made to this particular implementation, it is contemplated that HA 500 may embody many forms and include multiple and/or alternative components.

In exemplary embodiments, HA 500 communicates with one or more nodes, MRs, FAs, PEs, CEs, etc., via communication interface 501, which may be configured to implement various communication protocols, including, for example, border gateway protocol (BGP), routing information protocol (RIP), open shortest path first (OSPF), generic routing encapsulation (GRE), simple network management protocol (SNMP), hypertext transfer protocol (HTTP), label distribution protocol (LDP), user datagram protocol/internet protocol (UDP/IP), transmission control protocol/internet protocol (TCP/IP), MIPv4, MIPv6, NEMOv4, NEMOv6, and the like. In one embodiment, communication interface 501 implements one or more hybrid communication schemes in order to facilitate MIP and MPLS VPN communications via mobile subnets 107 and 109, wireless domain 131, wired domain 129, and/or enterprises 119-125. In this manner, HA 500 may further include one or more applications (not shown) for supporting suitable secure connections, such as, for example, transport layer security (TLS), tunneled transport layer security (TTLS), extensible authentication protocol (EAP), secure sockets layer (SSL), secure shell (SSH), internet protocol security (IPsec), and the like.

Routing and forwarding logic 507 may include hardware and/or software for routing packets toward their final "destinations," which may be one or more home addresses, care-of-addresses, IP sub-nets, and the like. With respect to wired domain 129 (that, in exemplary embodiments, implements a VPN architecture, such as an MPLS VPN architecture), routing and forwarding logic 507 may provision traffic onto network paths 153 and 155, such as label switched paths (LSP). As such, routing and forwarding logic 507 may be configured to provision a flow of traffic onto a particular LSP by directing, for example, one or more packets embodying the flow to a proper port of communication interface 501 based on, for example, packet header information. With respect to wireless domain 131, routing and forwarding logic 507 may provision traffic into one or more traffic tunnels, such as traffic tunnels 135-141. Accordingly, routing and forwarding logic 507 can be configured to provision a flow of traffic onto a particular traffic tunnel by directing, for example, one or more packets embodying the flow to a proper port of communication interface 501 based on, for instance, one or more home addresses, care-of-addresses, IP sub-nets, etc. These addresses may be populated within multiple routing tables respectively corresponding to MRs 143 and 145. It is noted that these routing tables may be stored to HA 500, such as stored to addressing information repository 509 and/or subscriber information repository 511.

In addition to routing and forwarding traffic, routing and forwarding logic 507 may perform various routing and/or forwarding procedures on, for example, header information associated with packets embodying a traffic flow. That is, header information may be suitably tailored for transmission depending on whether a "next" hop node is part of wired domain 129 or wireless domain 131. If the next hop node is, for example, within wired domain 129, such as PE 147, routing and forwarding logic 507 may convert a packet that enters from wireless domain 131 into a label-switched packet by, for instance, adding label switching header information to the packet. In addition to outer label-switching information identifying a next hop node, the label-switching header information may also include other (e.g., stacked) label-switching information (e.g., mobility label information) for identifying the host registered at the originating node by mobile support module 505. Conversely, routing and forwarding logic 507 may convert a label-switched packet that enters from wired domain 129 into a MIP/NEMO packet by stripping away any label-switching header information, and forwarding the packet to an appropriate "destination" address based on information stored to addressing information repository (or memory) 509, e.g., the multiple routing tables.

In exemplary embodiments, routing and forwarding logic 507 may also include hardware and/or software for communicating with other routers for the purpose of gathering and storing routing information, such as addressing information stored to addressing information repository (or memory) 509. Routing and forwarding logic 507 may enforce specific sets of procedures for communicating (or advertising) routing messages (e.g., label distribution protocol (LDP), constraint-based LDP, MP-BGP, etc.) concerning router destinations (e.g., labels, network addresses, and the like). Through the exchange of routing messages, HA 500 may manage routing and forwarding information, which may also be stored to addressing information repository 509, such as in the form of one or more forwarding tables, routing tables, etc. It is generally noted that addressing information 509 may also include other data, such as one or more home addresses, one or more care-of-addresses, one or more mobility lifetimes, and one or more virtual routing and forwarding instance schemes, as well as any other suitable routing and/or forwarding information.

Mobility support module 505 supports MRs 143 and 145. Namely, mobility support module 505 advertises mobility agent information to MRs 143 and 145 so as to enable MRs 143 and 145 to register with HA 500 and, thereby, obtain a home address from mobility support module 505. Further, mobility support module enables MRs 143 and 145 to register or unregister sub-nets associated with MRs 143 and 145, e.g., those networking addresses associated with nodes 103 and 105. It is also noted that mobility support module 505, such as, in conjunction with, routing and forwarding logic 507 and communication interface 501, may propagate routing information for MRs 143 and 145 across routers of system 100, such as across FA 133, PEs 147-151, and CEs 165-171, etc. It is noted that MRs 143 and 145 may initiate registration with mobility support module 505 and, thereby, register themselves at HA 500 by sending a series of messages to mobility support module 505. These messages (or signals) may convey various networking parameters associated with MRs 143 and 145 and/or nodes 103 and 105, such as an identifier, an IP address, a priority level of transport service, etc.

According to exemplary embodiments, mobility support module 505 may also be configured to facilitate the provisioning of tunnels between HA 500 and FA 133, as well as between HA 500 and MRs 143 and 145. In certain instances, MIP/NEMO functionality enables MRs 143 and 145 to establish tunnels directly with HA 500 within, for example, one or more IP-IP or GRE tunnels established between HA 500 and FA 133. As such, when an MR registers a care-of-address and one or more associated networking addresses (or prefixes/sub-nets) with HA 500, correlation module 503 may be configured to associate and de-associate the networking addresses with the care-of-address. In other words, routing and forwarding logic 507 may utilize "double" tunnel assignments between HA 500, FA 133, and MRs 143 and 145 to route and forward traffic, i.e., use of tunnels 135 and 137 to reach a home address of an MR, and use of tunnels 139 and 141 to reach nodes 103 and 105.

To interwork between tunnels 135-141 and pathways 153 and 155, mobility support module 505, in conjunction with correlation module 503, may also be configured to partition the established "double" tunnels based on enterprise associations, which may be stored to subscriber information repository (or memory) 511. For instance, tunnels 135 and 139 may be correlated to Client "A" and tunnels 137 and 141 may be correlated to Client "B." As such, the partitioned tunnels may be provisioned onto corresponding VRF instances (e.g., VFR instances 157-163) carried to enterprises 119-125 via pathways 151 and 153 of wired domain 129. As such, routing entries (e.g., networking addresses) associated with, for example, nodes 103 and 105 (that are respectively registered by MRs 143 and 145 with HA 500), may be integrated into multiple routing tables (e.g., two separate tables) utilized by HA 101 for routing and forwarding traffic over service provider infrastructure 127. In this manner, those network addresses "behind" MRs 143 and 145, i.e., the networking addresses (sub-nets) associated with nodes 103 and 105, may overlap or even be identical.

According to various exemplary embodiments, correlation module 503 may also be configured to correlate subscriber information (e.g., home addresses assigned to MRs 143 and 145 by HA 500 and network access identifiers (NAI) that is respectively associated with MRs 143 and 145, with respective MIP/NEMO registration information (e.g., MIP/NEMO home addresses) received by HA 101 during HA-MR MIP/NEMO registration with mobility support module 505. In this manner, correlation module 503 may discard MR home addresses (MR-HADDR) carried in MIP/NEMO registration requests (RRQ) associated with particular MRs in place of correlated, existing home addresses assigned to the particular MRs by mobility support module 505, as well as in place of other existing subscriber information (e.g., NAIs) associated with the particular MRs. In this manner, HA 500 need not uniquely manage and coordinate respective MR-HADDRs or any other additional NEMO control information carried inside the MIP/NEMO RRQ of the particular MRs of system 100.

While not illustrated, HA 500 may also include one or more processing units, as well as one or more memory units. The memory units may generally include random access memory (RAM), read-only-memory (ROM), and/or one or more permanent mass storage devices, such as a hard disk drive, tape drive, optical drive, and/or floppy disk drive. In this manner, the memory units may store various information, parameters, commands, programs, instructions, etc., for controlling operation of HA 500, which may be effectuated via the one or more processing units.

The processes described herein for extending private enterprise networking to wireless interconnecting domains may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
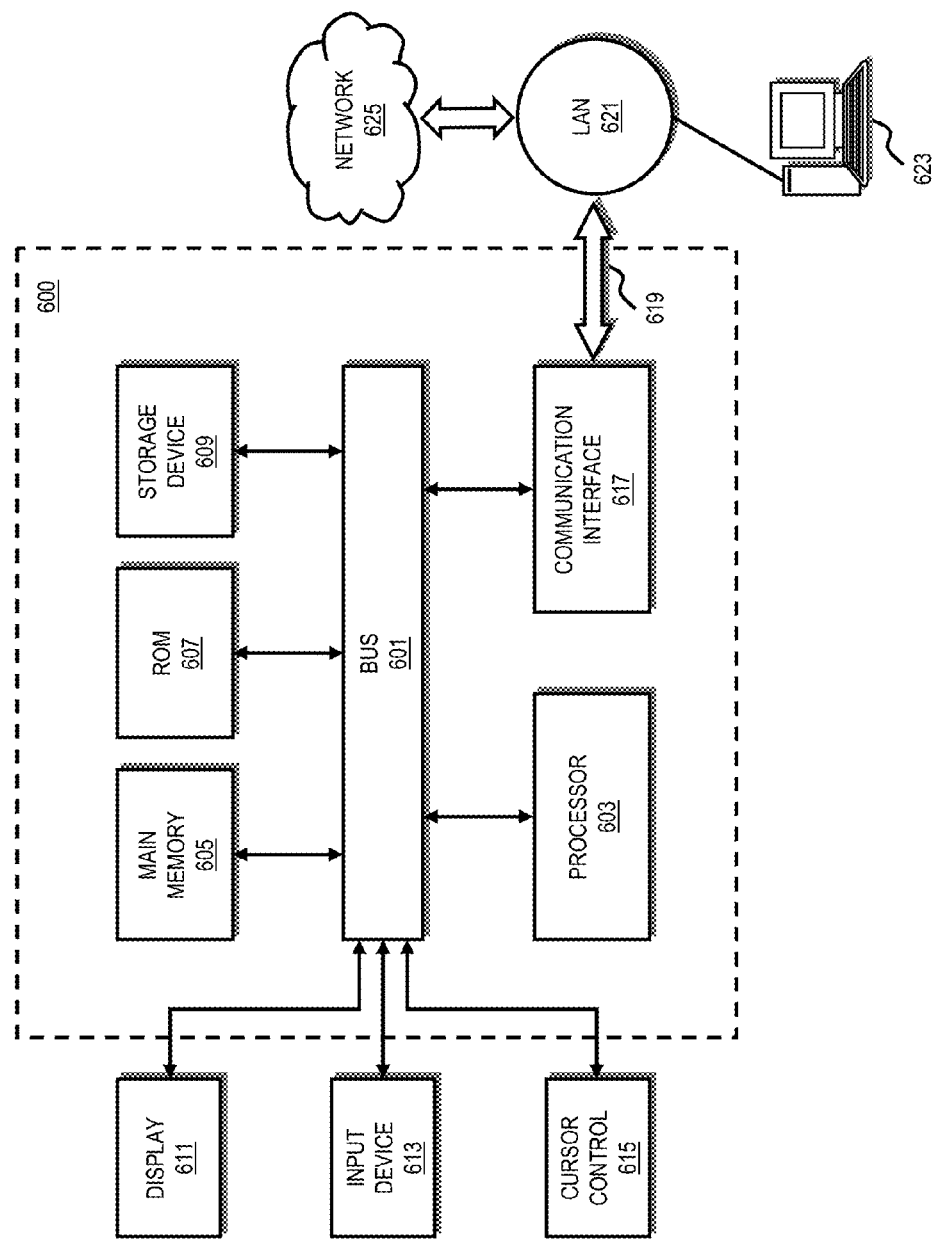
FIG. 6 is a diagram of a computer system that can be used to implement various exemplary embodiments.

FIG. 6 illustrates computing hardware (e.g., computer system) 600 upon which an embodiment according to the invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    maintaining, by a processor, within a home agent, a first routing table for a first wireless router configured to route according to a first address space corresponding to one or more devices;
    maintaining, within the home agent, a second routing table for a second wireless router configured to route according to a second address space corresponding to one or more other devices, wherein at least one of the one or more devices and at least one of the one or more other devices have an identical address, and wherein the identical address is maintained, within the home agent, in each of the first and second routing tables;
    determining whether to forward network traffic having a destination address indicating the identical address to the one or more devices or to the one or more other devices based on whether the network traffic is associated with the first or second wireless router; and
    forwarding, by the processor, the network traffic to the first or second wireless router.

2. A method of claim 1, wherein the first address space is assigned to a first subscriber, and the second address space is assigned to a second subscriber, further comprising:
    correlating the first wireless router to a data record of the first subscriber; and
    correlating the second wireless router to a data record of the second subscriber,
    wherein determining whether to forward network traffic having a destination address indicating the identical address to the one or more devices or to the one or more other devices is further based on whether the network traffic is associated with the first or second subscriber.

3. A method of claim 2, further comprising:
    establishing a plurality of tunnels with a foreign agent to communicate with, respectively, a first data network associated with the first subscriber and a second data network associated with the second subscriber.

4. A method of claim 2, further comprising:
    receiving, from the first wireless router, a registration request specifying a network mobility address of the first wireless router; and
    disregarding the network mobility address of the first wireless router.

5. A method of claim 1, wherein the first address space and the second address space correspond, respectively, to a first virtual private network and a second virtual private network.

6. A method of claim 5, wherein the first virtual private network and the second virtual private network operate according to a multi-protocol label switching (MPLS) protocol.

7. A method of claim 6, wherein the first and second wireless routers are mobile and configured to operate according to a mobile Internet Protocol addressing protocol and a network mobility protocol.

8. A method of claim 1, further comprising:
receiving, from the first wireless router, a registration request specifying a network mobility address of the first wireless router; disregarding the received network mobility address of the first wireless router; and
determining a network mobility address for the registration request based on a data record correlated to the first wireless router.

9. A device comprising:
a processor configured to:
operate as a home agent for a first wireless router configured to route according to a first address space corresponding to one or more devices and a second wireless router configured to route according to a second address space corresponding to one or more other devices; and
determining whether to forward network traffic having a destination address indicating an identical address to the one or more devices or to the one or more other devices based on whether the network traffic is associated with the first or second wireless router; and
a memory configured to store a first routing table for the first wireless router and a second routing table for the second wireless router, wherein at least one of the one or more devices and at least one of the one or more other devices have the identical address, and wherein the identical address is stored in each of the first and second routing tables.

10. A device of claim 9, wherein the first address space is assigned to a first subscriber, and the second address space is assigned to a second subscriber, the processor being further configured to:
correlate the first wireless router to a data record of the first subscriber; and
correlate the second wireless router to a data record of the second subscriber,
wherein the determination of whether to forward network traffic having a destination address indicating the identical address to the one or more devices or to the one or more other devices is further based on whether the network traffic is associated with the first or second subscriber.

11. A device of claim 10, further comprising:
a communication interface configured to establish a plurality of tunnels with a foreign agent to communicate with, respectively, a first data network associated with the first subscriber and a second data network associated with the second subscriber.

12. A device of claim 10, wherein the processor is further configured to receive, from the first wireless router, a registration request specifying a network mobility address of the first wireless router, and to disregard the network mobility address of the first wireless router.

13. A device of claim 9, wherein the first address space and the second address space correspond, respectively, to a first virtual private network and a second virtual private network.

14. A device of claim 13, wherein the first virtual private network and the second virtual private network operate according to a multi-protocol label switching (MPLS) protocol.

15. A device of claim 14, wherein the first and second wireless routers are mobile and configured to operate according to a mobile Internet Protocol addressing protocol and a network mobility protocol.

16. A device of claim 9, wherein the processor is further configured to receive, from the first wireless router, a registration request specifying a network mobility address of the first wireless router, to disregard the network mobility address of the first wireless router, and to determine a network mobility address for the registration request based on a data record correlated to the first wireless router.

17. A method comprising:
establishing a first tunnel to a foreign agent for communicating with a first wireless router configured to route according to a first address space corresponding to one or more devices of a first virtual private network;
establishing a second tunnel to the foreign agent for communicating with a second wireless router configured to route according to a second address space corresponding to one or more other devices of a second virtual private network, wherein at least one of the one or more devices has an identical address that is identical to an address of at least one of the one or more other devices;
determining whether to forward network traffic having a destination address indicating the identical address to the one or more devices or to the one or more other devices based on whether the network traffic is associated with the first or second virtual private network; and
selecting between the first and the second tunnel for routing the network traffic based on the determination.

18. A method of claim 17, wherein the first address space is assigned to a first subscriber, and the second address space is assigned to a second subscriber, further comprising:
correlating a modem of the first wireless router to a data record of the first subscriber; and
correlating a modem of the second wireless router to a data record of the second subscriber,
wherein the determination of whether to forward network traffic having a destination address indicating the identical address to the one or more devices or to the one or more other devices is further based on whether the network traffic is associated with the first or second subscriber.

19. A method of claim 17, wherein the first virtual private network and the second virtual private network operate according to a multi-protocol label switching (MPLS) protocol.

20. A method of claim 19, wherein the first and second wireless routers are mobile and configured to operate according to a mobile Internet Protocol addressing protocol and a network mobility protocol.

* * * * *